United States Patent [19]
Yamakoshi

[11] Patent Number: 5,126,175
[45] Date of Patent: Jun. 30, 1992

[54] MEDICAL SOLUTION CONTAINER

[75] Inventor: Kenichi Yamakoshi, Sapporo, Japan

[73] Assignee: Material Engineering Technology Laboratory, Inc., Tokyo, Japan

[21] Appl. No.: 612,169

[22] Filed: Dec. 20, 1990

Related U.S. Application Data

[60] Division of Ser. No. 267,717, Nov. 3, 1988, Pat. No. 5,023,119, which is a continuation of Ser. No. 27,228, filed as PCT/JP86/0029, Jun. 13, 1986, abandoned.

[30] Foreign Application Priority Data

| Jun. 14, 1985 | [JP] | Japan | 60-129563 |
| Jul. 2, 1985 | [JP] | Japan | 60-145176 |
| Jul. 3, 1985 | [JP] | Japan | 60-146125 |
| Oct. 18, 1985 | [JP] | Japan | 60-232785 |
| Oct. 18, 1985 | [JP] | Japan | 60-232786 |

[51] Int. Cl.⁵ ............................................. A61B 19/00
[52] U.S. Cl. .................................. 428/35.5; 383/105; 428/156; 604/408
[58] Field of Search ................. 428/156, 36.92, 35.5; 383/105; 604/408

[56] References Cited

U.S. PATENT DOCUMENTS

| 3,613,281 | 3/1970 | Lennartz | 40/359 |
| 4,010,783 | 3/1977 | Ralston | 206/583 |
| 4,090,541 | 5/1978 | Cammarata, III et al. | 604/408 |
| 4,415,085 | 11/1983 | Clarke et al. | 383/9 |
| 4,469,227 | 9/1984 | Faust | 383/119 |
| 4,479,989 | 10/1984 | Mahal | 604/408 |
| 4,576,602 | 3/1986 | Levin et al. | 604/408 |
| 4,619,650 | 10/1986 | Wisdom | 206/628 |
| 4,686,125 | 8/1987 | Johnston et al. | 428/214 |

FOREIGN PATENT DOCUMENTS

| 8305102 | 3/1983 | France . |
| 52-13975 | 2/1977 | Japan . |
| 56-95050 | 8/1981 | Japan . |
| 58-109064 | 6/1983 | Japan . |
| 59-79138 | 5/1984 | Japan . |

Primary Examiner—James J. Seidleck
Attorney, Agent, or Firm—Dykema Gossett

[57] ABSTRACT

This invention relates to a container for medical solution comprising a port portion (12), a shoulder portion (13) and a flat body portion (14), and is characterized in that side peripheral areas (15) and tail end peripheral area (16) are welded by a sealer (101). This configuration allows the container to flatten as the contained medical solution drains, thus the solution is completely drained and does not remain in the container.

The same advantage can be expected when the wall thickness of the container in the side peripheral areas (15) and the tail end peripheral area (16) are made to be thinner than one in the central area of the body portion instead of welding the side peripheral area (15) or the tail end peripheral area (16).

7 Claims, 6 Drawing Sheets

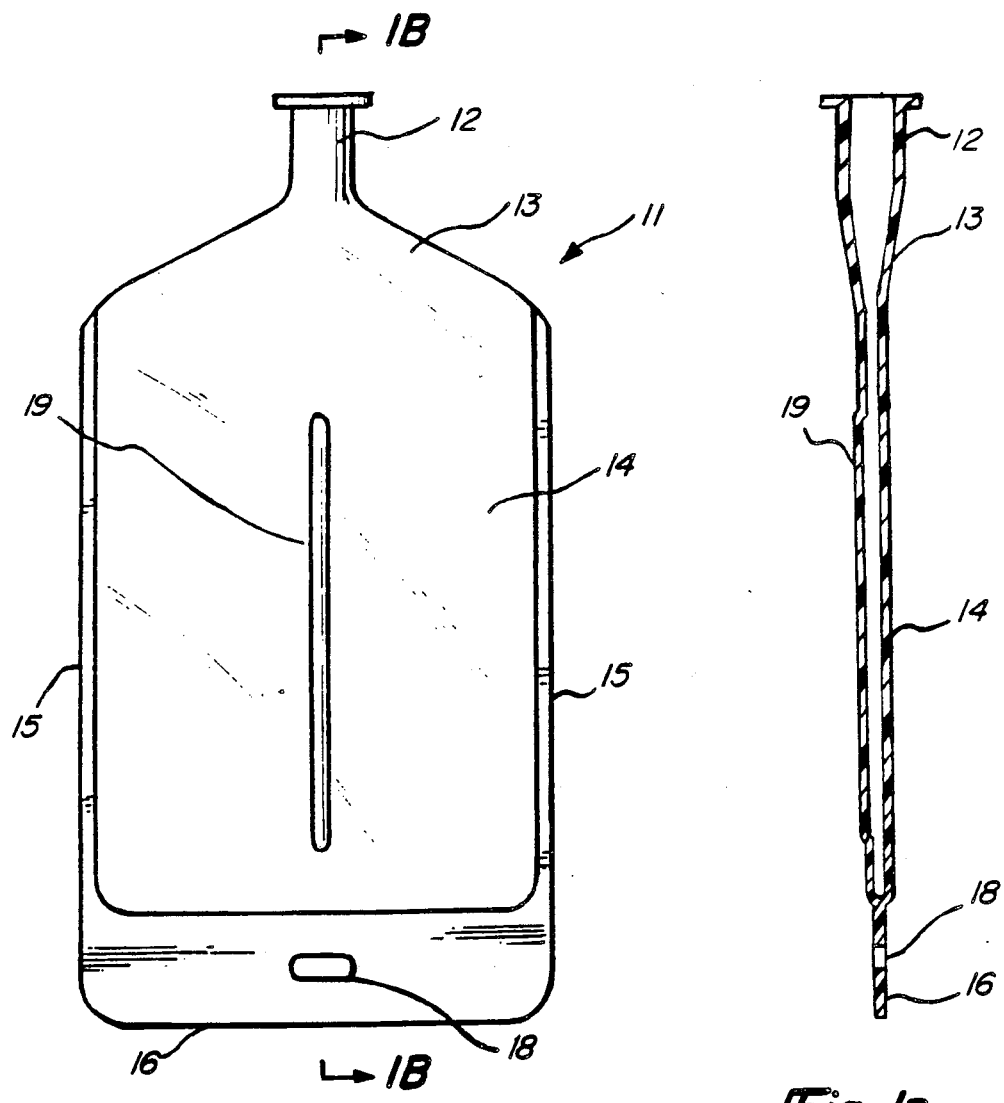
*Fig-1A*
*Fig-1B*
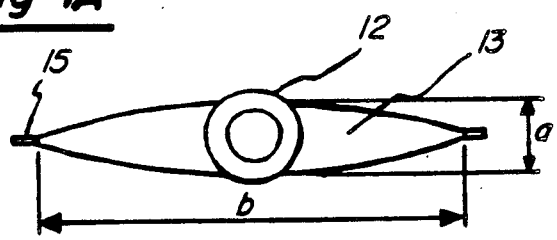
*Fig-1C*

MEDICAL SOLUTION CONTAINER

This is a divisional of copending application(s) Ser. No. 07/267,717, filed Nov. 3, 1988, U.S. Pat. No. 5,023,110, which is a continuation of 07/027,228 filed as PCT/JP86/0029, Jun. 13, 1986, now abandoned.

TECHNICAL FIELD

This invention relates to a container for medical solution and the method of making the same. It especially relates to the container for medical solution for a closed injection system which is easily collapsible and is not damaged by autoclave sterilization, and the method of making the same.

BACKGROUND ARTS

A closed system has been recently used in medicine, to prevent the contained solution, such as infusion therapy, from contact with the atmosphere. Configuration and materials of the container for medical solution for a closed injection system must be considered such that it is soft enough to drain the contained solution with gravity pressure. This kind of solution container also must be able to endure autoclave sterilization for the contained solution.

Further, the container is preferably made of transparent material so that the level of the solution can be checked easily and particle matter can be inspected from the outside. In order to obtain these objectives, soft polyvinyl chloride or ethylene-vinyl acetate copolymer have been extensively utilized as the materials of the conventional solution container. Soft polyvinyl chloride poses a health problem for human body, where a great amount of plasticizer may dissolve into the contained solution. On the other hand, ethylene-vinyl acetate copolymer may dissolve into the contained solution as the result of deacetating at forming, and does not have any heat-resistance during autoclave sterilization.

Therefore, ethylene-vinyl acetate copolymer must be cross-linked by radiation such as gamma ray in order to get specified heat-resistance, which causes an additional process in producing containers. In addition to this, the radiation decomposes ethylene-vinyl acetate copolymer to produce organic substances such as acetone, acetaldehyde, acetic acid, isobutane, n-butane, butadiene, propylene etc., and therefore air ventilation is required to exhaust these organic substances, which adds an additional process in producing containers and makes it difficult to keep the work area safe.

Polyolefin, polyamide, polyurethane etc., being much safer to use and having superior properties, have been considered for the materials of containers for medical solution, especially polyolefin has been seen as the most adequate one because of its low price. However, it was extremely difficult to produce a desired container for medical solution with these materials; polyolefin, polyamide, polyurethane etc. As polyolefin, polyamide and polyurethane have lower dielectric loss than polyvinyl chloride or ethylene-vinyl acetate copolymer, high frequency electric fields do not produce enough heat to dissolve the material, thereby these polymers are not available for high frequency sealing as in the case of polyvinyl chloride. Accordingly, for example, when a container for medical solution is made of polyolefin tube which is produced by inflation forming, or is made of two pieces of polyolefin sheet, the open end of the tube itself or the specified part covered with an additional sheet must be welded by impulse sealing or heat sealing. However, it is difficult to weld complicated structures with impulse sealing, in contrast to high frequency sealing, and also difficult to weld the materials with different thickness, on the surface of structures such as pipes, because impulse sealing and heat sealing induce heat to the materials from the outside, thus these ways of sealing make it difficult to form a small port on the top of a container for medical solution.

On the other hand, blow molding containers for medical solution made from polyolefin may be considered, in which the small port portion is integral with the body portion. However, the container for medical solution made by this method has the problem where the contained solution can not be completely drained, because the material is not soft enough, the body portion is cylindrical, the wall thickness of the body portion is almost uniform, and the wall thickness of the body near the peripheral area in tail end is greater than the center portion. Therefore, the container for medical solution made by the conventional blow molding is not available for a closed system. No container for medical solution suitable for containers for infusion fluid or the like has been developed until now by these methods.

The object of this invention is to provide a new container for medical solution and the method of making the same.

Another object of this invention is to also provide a container for medical solution made from organic polymers, suitable for containers for infusion fluid or the like, and the method of making the same.

Further object of this invention is to provide a container for medical solution made from organic polymers, which can drain the contained solution easily and completely, and the method of making the same.

DISCLOSURE OF THE INVENTION

This invention relates to the container for medical solution made from organic polymers, comprising of the integrated port portion, the shoulder portion, and the flat body, wherein forming the container by blow molding and welding its side peripheral areas and/or tail end peripheral area make it easy to completely drain the contained solution.

The further preferred embodiment is the container for medical solution made from polyolefin, comprising of the port portion, the shoulder portion, and the flat body portion, wherein the density of polyolefin is 0.915–0.930 g/cm$^3$ and Olsen stiffness is under 4000 kg/cm$^2$, the wall thickness of side peripheral areas and/or tail end peripheral area of the body portion is thinner than one of the central portion, and the shorter length of the shoulder portion does not exceed 30 mm. This container is suitable for a closed system, as the pressure difference between the inside and the outside in the body makes it easy for the body portion to collapse.

This invention, also, discloses the method of making the container for medical solution characterized in that after a blow molding product comprising of the integral port, shoulder and body is formed from organic polymer, at least one side of side peripheral areas and/or tail end peripheral area of the blow molding product is welded.

BRIEF DESCRIPTION OF THE DRAWINGS

FIG. 1(a) is a front view in the first embodiment of the container for medical solution of this invention.

FIG. 1(b) is a transverse sectional view taken along line 1B—1B of FIG. 1(a).

FIG. 1(c) is a top view in the first embodiment of the container for medical solution of this invention.

BEST MODE FOR CARRYING OUT THE INVENTION

Figures 2A, 2B:
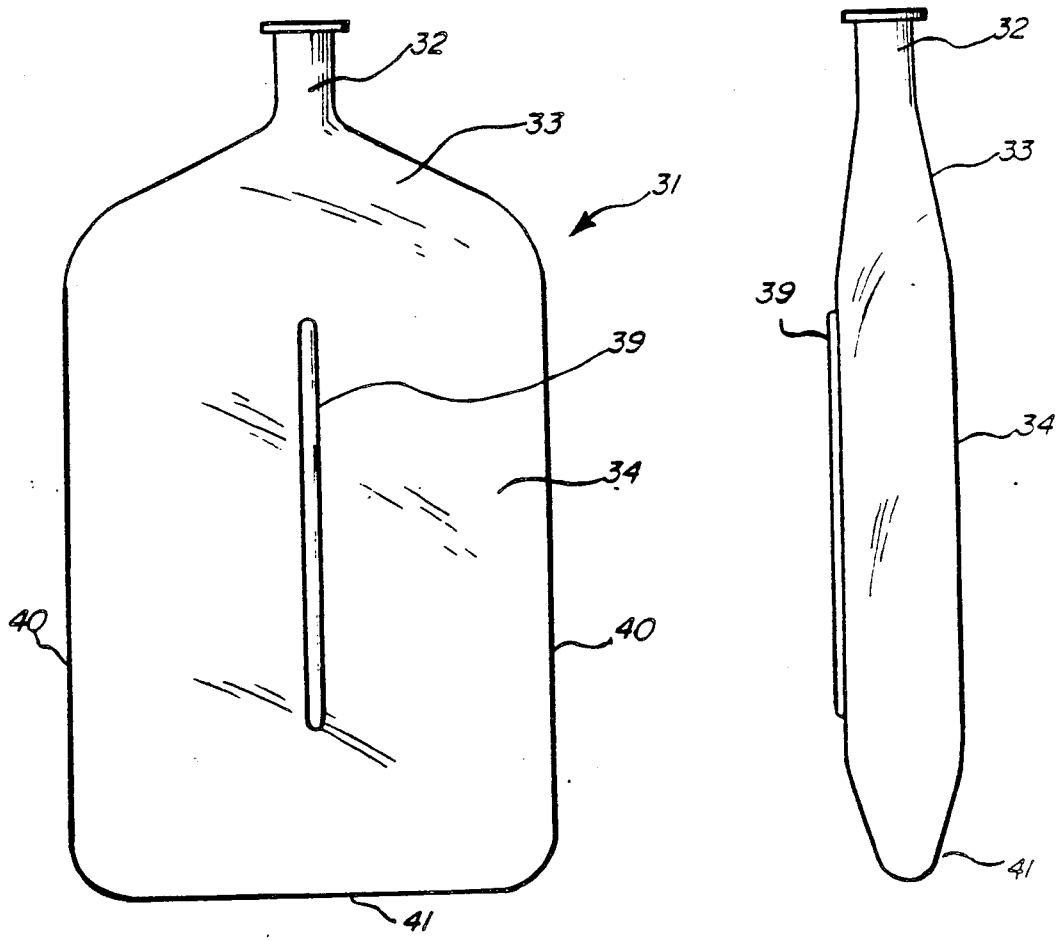
FIG. 2(a) is a front view in the second embodiment of the blow molding product for making the container for medical solution of this invention.
FIG. 2(b) is the side view.

The invention will be explained with figures as follows.

As the first embodiment shown in FIGS. 1(a), (b) and (c), the container for medical solution of the invention made from organic polymers, is a blow molding product in which a small port 12, shoulder 13, and body 14 are formed as an integral, and side peripheral areas 15 and tail end peripheral area 16 of body 14 are welded. This configuration allows the inside surfaces of body 14, to contact each other in the whole and thus resulting in the confined space of the container when the solution is not contained or when drained. Therefore, almost no solution remains in the container when this container for medical solution 11 is used as in FIG. 8. Even though either welding of side peripheral areas 15 or tail end peripheral area 16 is effective, both welding of side peripheral areas 15 and tail end peripheral area 16 are further preferable.

Although many kinds of organic polymers are available for the material of the container for medical solution 11 of the invention, polyolefin is preferable. Polyolefin suitable for use in the invention includes low density polyethylene, polypropylene and the like having a flexural elastic modules not greater than 4000 kg/cm$^2$. Further preferable polyolefin includes low density polyethylene having a density of 0.915–0.939 g/cm$^3$.

Linear low density polyethylene; LLDPE different from general low density polyethylene is further preferable material. LLDPE is a copolymer of ethylene and α-olefin; α-olefin includes butane-1 of which carbon number is 4, methylpentane-1 of which carbon number is 6, octane of which carbon number is 8, and the like. Further preferred material for the container for medical solution is LLDPE of which α-olefin is 4 methylpentane-1 and octane-1.

LLDPE in which α-olefin is 4 methylpentane-1 and octane-1, being soft, transparent and durable, is suitable for the material of the container for medical solution.

Another suitable material is polymer mixture of 50–90 wt % LLDPE and 10–50 wt % block copolymer which is contrived from saturated intermediate block consisting of conjugated diene copolymer units, and both-end blocks consisting of styrene unit.

The preferable polymer composition of said polymer is that LLDPE is between 50 and 90 wt % and block copolymer is between 10 and 50 wt %. Block copolymer of less than 10 wt % can not soften copolymer, and one of greater than 50 wt % makes it difficult to form the container, especially in case of blow molding. Therefore the most preferable composition is such that LLDPE is between 60 and 80 wt % and block copolymer is between 20 and 40 wt %.

Minor axis, indicated a in FIG. 1(c), of oval shoulder portion 13 connected to the small diameter port 12 of the container for medical solution 11, is preferred to be not greater than 30 mm. If the minor axis a of shoulder 13 is over 30 mm, the inside surfaces of the body will almost not contact when the contained solution drained. It results in a relatively large amount of solution remaining in the container going to waste without draining, as shown in the following table.

This table shows remaining solution in the container when the major axis length b is respectively 100 mm, 120 mm, 150 mm and minor axis length a changes from 15 mm to 45 mm. It is apparent that the remaining solution increases drastically, independent of the length b of major axis, when the minor axis length a is over 30 mm.

| | Remaining Solution (ml) | | |
| --- | --- | --- | --- |
| | the length b of major axix | | |
| the length a of minor axix | 100 mm | 120 mm | 150 mm |
| 15 mm | 15 | 18 | 20 |
| 20 mm | 25 | 30 | 40 |
| 25 mm | 40 | 50 | 60 |
| 30 mm | 60 | 70 | 85 |
| 35 mm | 85 | 100 | 120 |
| 40 mm | 110 | 130 | 160 |
| 45 mm | 140 | 165 | 200 |

Providing the protruding portion 19 on central area of body 14 from the top to the bottom, allows the remaining solution to be easily recognized when air is introduced into the space of the protruding portion 19.

All air within the container for medical solution is confined to the space of protruded portion 19 after draining the solution, hence the air confined to the space can not go out unless special suction or additional pressure to the container is given. Therefore, there is no danger of air contamination within the container for medical solution leaving the container and entering into a human body during normal infusion therapy.

The preferred thickness of the container for medical solution 11 of this invention is 1–4 mm., preferably 1.5–3 mm, at port 12, and 0.05–0.5 mm, preferably 0.1–0.3 mm at body 14. If the thickness of the body wall is less than 0.05 mm, the container for medical solution will be fragile, thereby becoming unsafe for use as a container for medical solution. On the other hand, if its thickness is over 0.5 mm, the softness will be lost and body 14 will be too hard to collapse, which causes a large amount of solution to remain in the container. The second embodiment, the way of making the container for medical solution of this invention having the aforementioned configuration, will be explained as follows. Blow molding product 31 made from organic polymer, comprising a small port 32 on the top, shoulder 33 and body 34, in FIGS. 2(a) and (b) is produced by blow molding in a unit. It is desirable that body 34 is formed evenly as possible. Due to this configuration, the side peripheral areas and/or the tail end peripheral area can be easily heated while the entire body of blow molding product 31 is flatly collapsed, and also the container can be easily collapsed as the solution is drained.

Figure 3:
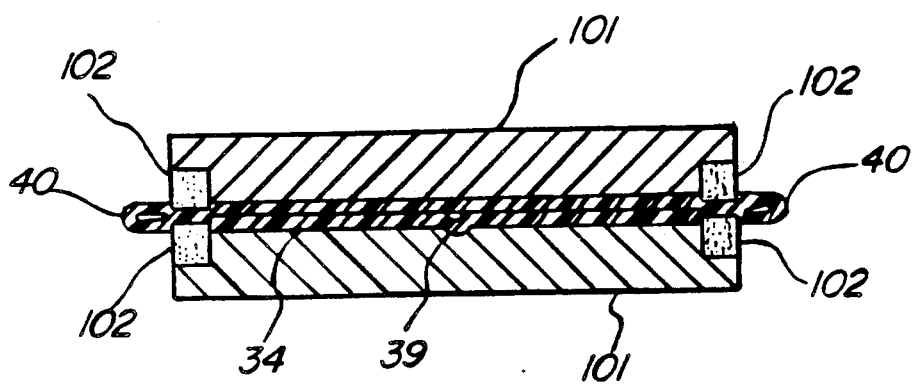
FIGS. 3 and 4 are transverse sectional views in each process showing the method of making said blow molding product.
Figure 4:
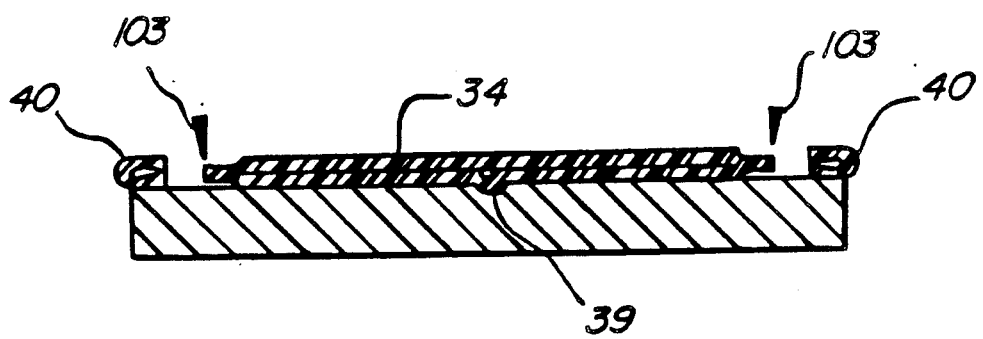

Body 34 of blow molding product 31, produced in the aforementioned way, is secondly pressed by pressing apparatus 101 as shown in FIG. 3. Then sealer 102 heats and welds side peripheral areas 40 and/or tail end area 41 while body 34 is pressed as shown in FIG. 3. In this process, the extra portion of side peripheral areas 40 and/or tail end area 41, melt down during heating. Alternatively, as shown in FIG. 4, cutter 103 cuts off the undesired part of side peripheral areas 40 and/or tail end area 41 after welding thereof thereby obtaining the completed container for medical solution 11. Available sealer 103 includes one used for heat sealing method, one used for impulse sealing method or the like, depending on the material adopted for the container for medical solution.

Tail end area 41, not shown in FIGS. 3 and 4, is similar to peripheral areas 40. Side peripheral areas 15 and tail end area 16 of the container for medical solution, obtained in the aforementioned steps, correspond respectively to side peripheral areas 40 and tail end area 41 of blow molding product 31.

Figure 5A:
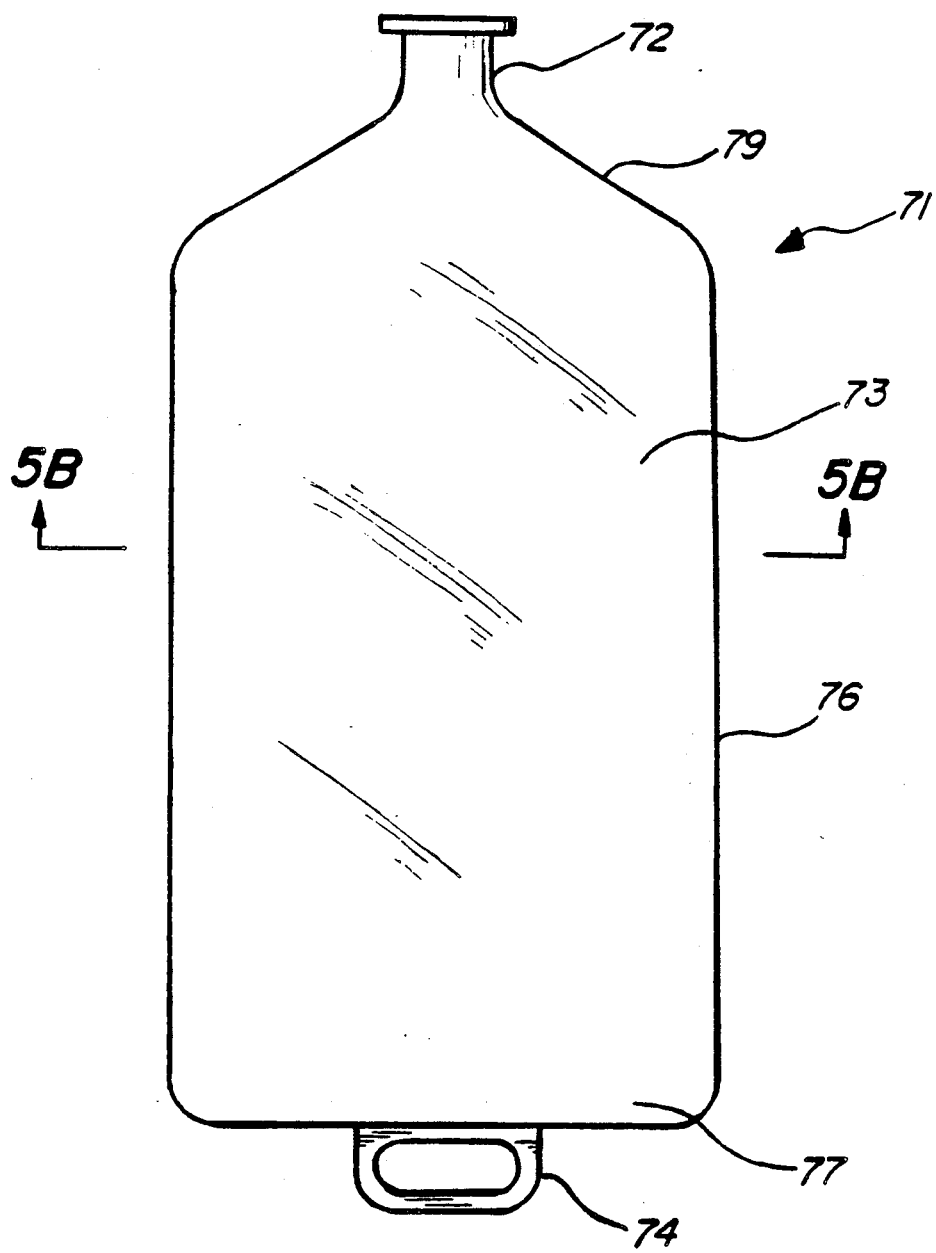
FIG. 5(a) is a front view in the third embodiment of the container for medical solution of this invention.
Figure 5B:
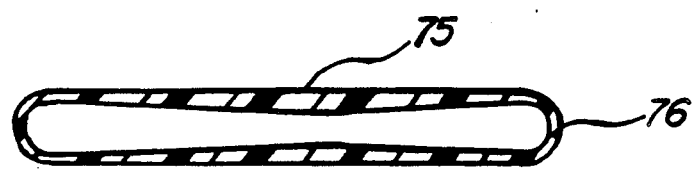
FIG. 5(b) is a transverse sectional view taken along line 5B—5B of FIG. 5(a).

The third embodiment of the container for the medical solution of the invention is shown in FIGS. 5(a) and (b). This container for medical solution 71 is a blow molding product made from polyolefin, comprising small port 72 on the top, body 73 adjacent to port 72 and hanger member 74 provided on the lower portion of body 73. Providing possible flatness on body 73 and the condition that minor axis of shoulder 79 is not over 30 mm, make body 73 collapsible.

Figure 6A:
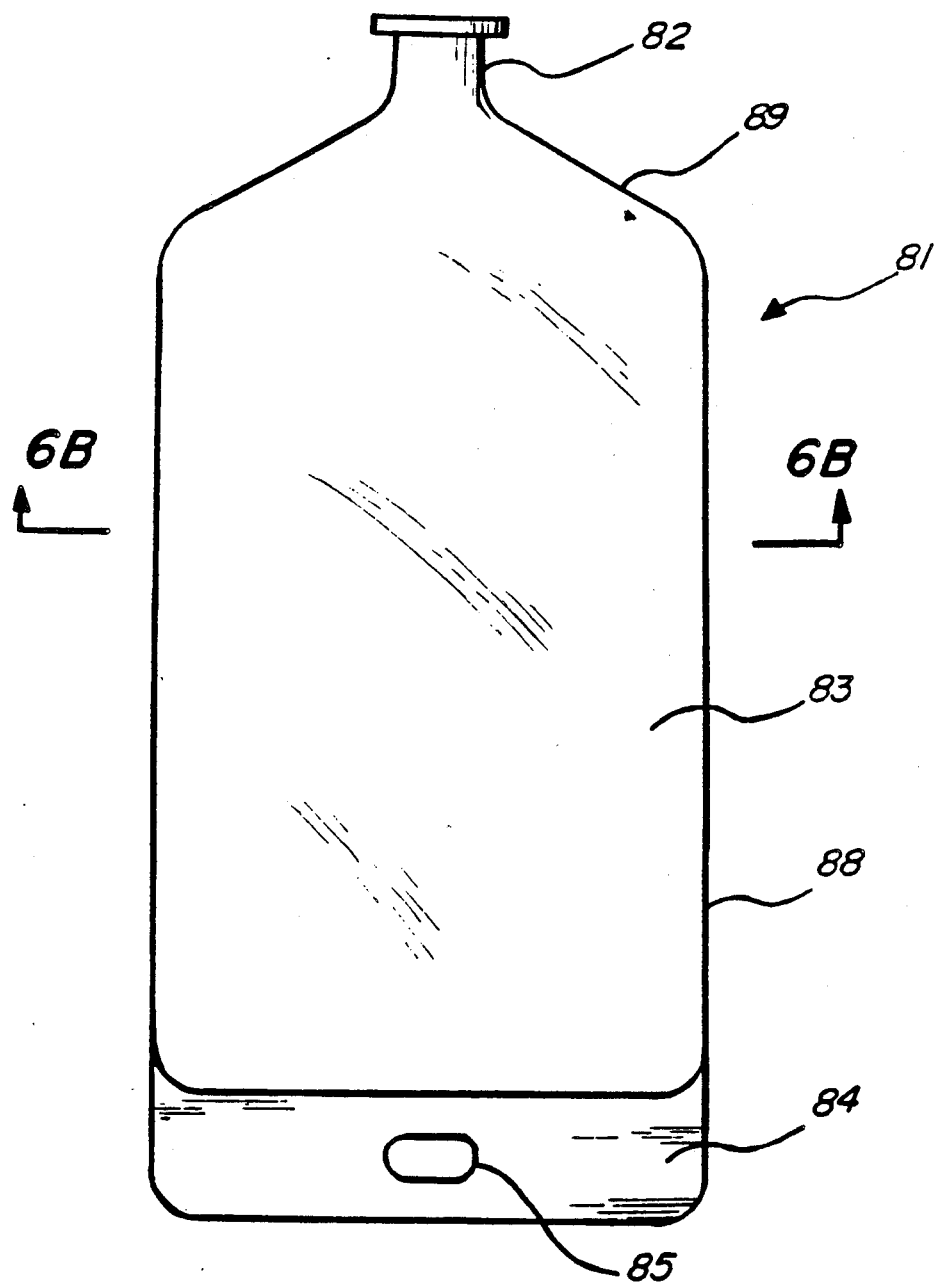
FIG. 6(a) is a front view in the improved third embodiment of the container for medical solution of this invention.
Figure 6B:
FIG. 6(b) is a transverse sectional view taken along line 6B—6B of FIG. 6(a).

In addition, as the wall thickness of body 73 is thinner in side peripheral areas 76 and/or tail end area 77 than in central portion 75, side peripheral areas 76 and/or tail end area 77 become more collapsible and inside surfaces of central portion 75 easily contact each other. Therefore the container in the third embodiment even if side peripheral areas 76 or tail end area 77 is not welded, can drain much more solution than the one in the first embodiment. In the further preferred container, as shown in FIGS. 6(a) and (b), for the improved third embodiment of the container for medical solution of this invention, side peripheral areas 88 and/or tail end area 84 is welded (welding side peripheral areas are not shown in FIGS. 6(a) and (b)), thus decreasing the remaining solution in the container after draining. The material of the container for medical solution 71 or 81 of this embodiment is polyolefin having a density of 0.91 to 0.930 g/cm$^3$ and Olsen stiffness below 4000 kg/cm$^2$. If polyolefin with a density over 0.930 g/cm$^3$ or Olsen stiffness over 4000 kg/cm$^2$ is used for the solution container, it will become hard and non-collapsible, thus not draining the solution smoothly. The aforementioned LLDPE is preferable for polyolefin.

The wall thickness in the body of the container for medical solution 71 of the embodiment is 0.05-0.35 mm, preferably 0.1-0.3 mm. The wall thickness around central portion 75, further, prefers to be 0.2-0.3 mm, and side preferential areas 76 and/or tail end area 77 is preferably thinner than the central portion being 0.1-0.2 mm.

Figure 7:
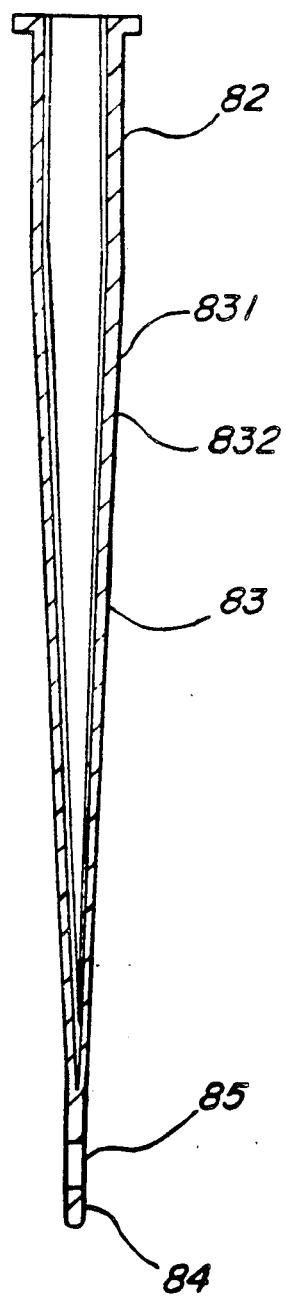
FIG. 7 is a sectional side view in the fourth embodiment of this invention.

FIG. 7 shows the third embodiment of the container for medical solution of the invention. Organic polymer 832 different from the material of the container body 831 laminates the inside wall of the solution container. The material of laminated layer 832 includes polyolefin, nylon, polyurethane or the like of which composition does not dissolve at high temperatures. When the body 831 of the container for medical solution is made from inexpensive organic polymer such as polyvinyl chloride, laminated layer 832 prevents plasticizer in polyvinyl chloride from dissolving into the solution at high-temperatures. Accordingly, this embodiment allows inexpensive organic polymer to be available for the material of the container body, and makes it possible to reduce production price.

Figure 8:
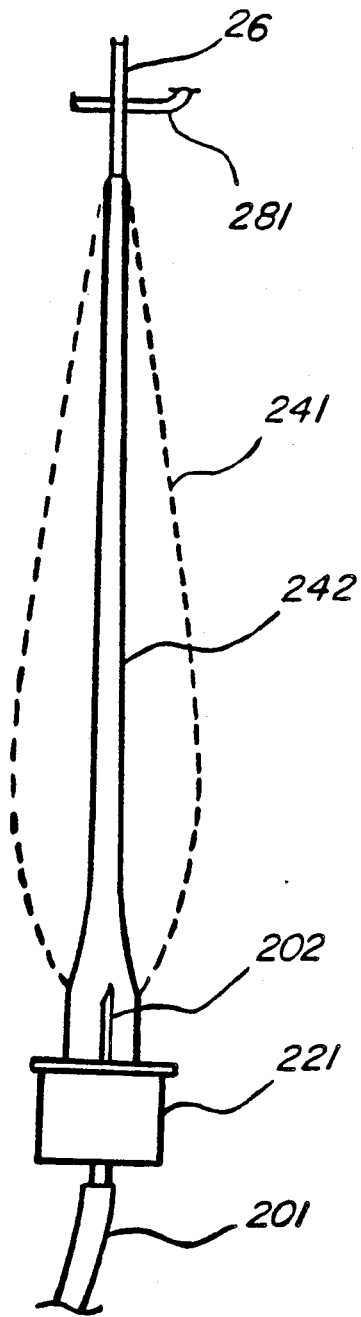
FIG. 8 is a figure showing how to use the container for medical solution of this invention.

FIG. 8 shows the use of the container for medical solution of the invention. The container is hung on hanger 281 with hanger member 26, and needle 202 is connected to solution administration set 201, then penetrated into the solution container through cap 221. Dotted lines in FIG. 8 show the the container filled with the solution. As the solution is drained, the container flexes into a flat configuration. Therefore, the container of the invention does not permit the solution to contact with the air, as in the case of a conventional container, and allows the solution to almost completely drain out of the container.

Examples of the embodiments of the invention will be explained as follows.

EXAMPLE 1

A blow molding product shown in FIGS. 2(a) and (b) was prepared by blow molding of linear low density polyethylene (available under the trade designation "Ultzex" from Mitsui Petrochemical Industries, Ltd. having a density of 0.93 g/cm$^3$ and Olsen stiffness of 3500 kg/cm$^2$). The wall thickness in central area of the body and side peripheral areas of the blow molding product was 250 m. The transverse cross section was oval with 120 mm major axis and with 15 mm minor axis.

As shown in FIG. 3, with the side peripheral areas and tail end peripheral areas of the blow molding product contacting each other by pressing the blow molding product, the heat sealer 101 heated and welded these parts for about 5 seconds, at 150° C., under 4 kg/cm$^2$.

Then the undesired portion 40 was cut off, and the container for medical solution was completed by providing hang member 16.

After the container was filled with 550 ml water, the port of the container was sealed with linear low density polyethylene film, and then a rubber plug was placed on it.

Sterilizing the parenteral solution container for 40 minutes at 115° C. with autoclaving did not cause any significant deformation.

Measurement of the draining amount vs time with the conventional infusion therapy as shown in FIG. 8 in which needle 202 was penetrated through the port, the distance between the port and the needle for a human body was 70 cm, and the draining rate of solution was adjusted to about 50 ml/minute with a clamp, proved that the draining amount was almost proportional to time. There was only 3 ml remaining in the container after draining.

However, in the case of the container made from linear low density polyethylene (available under the trade designation "MORETEC" from Idemitsu Petrochemical Co., Ltd. having a density of 0.935 g/cm$^3$ and Olsen stiffness of 4600 kg/cm$^2$), in the same method of this example, the remaining amount of the solution resulted in a greater value or 60 ml under the same measurement conditions as the above.

EXAMPLE 2

A blow molding product shown in FIGS. 5(a) and (b) was prepared by blow molding of linear density polyethylene (available under the trade designation "MORETEC" from Idemitsu Petrochemical Co., Ltd. having a density of 0.920 g/cm$^3$, Olsen stiffness of 2400 kg/cm$^2$). The wall thickness in central area of the body of the blow molding product was 300 m, and one of the side peripheral areas and the tail end peripheral area was 150 m. The transverse cross section was oval with 120 mm major axis and with 15 mm minor axis. This blow molding product was the container for medical solution itself without any other process.

After the container was filled with 550 ml water, the port of the container was sealed with linear low density polyethylene film, and then a rubber plug was placed on it.

Sterilizing the parenteral solution container for 40 minutes at 115° C. by autoclaving did not cause any significant deformation.

Measurement of the draining amount vs time with the conventional infusion therapy as shown in FIG. 8 in which needle 202 was penetrated through the port, the distance between the port and the needle for a human body was 70 cm, and the draining rate of solution was adjusted to about 50 ml/minute with a clamp, proved that the draining amount was almost proportional to time. There was only 7 ml remaining in the container after draining.

However, in the case of the container made from linear low density polyethylene (available under the trade designation "MORETEC" from Idemitsu Petrochemical Co., Ltd. having a density of 0.935 g/cm$^3$ and Olsen stiffness of 4600 kg/cm$^2$), in the same method of this example, the remaining amount of the solution resulted in a greater value or 60 ml under the same measurement conditions as the above.

EXAMPLE 3

A blow molding product shown in FIGS. 5(a) and (b) was prepared by blow molding of linear low density polyethylene (available under the trade designation "MORETEC" from Idemitsu Petrochemical Industries, Ltd. having a density of 0.92 g/cm$^3$, Olsen stiffness of 2400 kg/cm$^2$). The wall thickness in central area of the body was 250 μm, and one of the side peripheral areas and the tail end peripheral area of the blow molding product was 150 μm. The transverse cross section was oval with 120 mm major axis and with 15 mm minor axis.

As shown in FIG. 3, with the condition that side peripheral areas and tail end peripheral area of the blow molding product were contacting each other by pressing the blow molding product, the heat sealer 101 heated and welded these parts for about 5 seconds, at 150° C., under 4 kg/cm$^2$. Then the undesired portion was cut off, and the container for medical solution 81 was completed by providing hang member 85.

After the container was filled with 550 ml water, the port of the container was sealed with linear low density polyethylene film, and then a rubber plug was placed on it.

Sterilizing the parenteral solution container for 40 minutes at 115° C. with autoclaving did not cause any significant deformation.

Measurement of draining amount vs time with the conventional infusion therapy as shown in FIG. 8 in which needle 202 was penetrated through the port, the distance between the port and the needle for a human body was 70 cm, and the draining rate of solution was adjusted to about 50 ml/minute with a clamp, proved that the draining amount was almost proportional to time. There was only 5 ml remaining in the container after draining.

However, in the case of the container made from linear low density polyethylene (available under the trade designation "MORETEC" from Idemitsu Petrochemical Co., Ltd. with a density of 0.935 g/cm$^3$ and Olsen stiffness of 4600 kg/cm$^2$), in the same method of this example, the remaining amount of the solution resulted in a greater value or 55 ml under the same measurement condition as the above.

INDUSTRIAL APPLICABILITY

As described above, the container for medical solution of this invention is suitable to a parenteral solution bag for a closed system because of its high-temperature resistance at autoclave sterilization, its superior transparency, its highly reliable safety for human body, and its easiness of draining the solution.

I claim:

1. The container for a medical solution made from an organic polymer having a port portion, a shoulder portion, and a flat body portion, characterized in that said container is made by blow molding, and the wall thickness in the side peripheral area and/or tail end peripheral area is thinner than the thickness in the central area of said body portion.

2. The container for a medical solution defined in claim 1, wherein said organic polymer is polyolefin.

3. The container for a medical solution defined in claim 1 wherein the Olson stiffness is not greater than 4,000 kg/cm$^2$.

4. The container for a medical solution defined in claim 1, wherein said wall thickness of the body portion is between 0.05 mm and 0.35 mm.

5. The container for a medical solution defined in claim 1, wherein said organic polymer is primarily linear low density polyethelene.

6. The container for a medical solution defined in claim 1, wherein the protruded portion is provided on said body portion.

7. The container for a medical solution according to claim 1, wherein the inside surface of said container is laminated with a material different from the material of which the container is made.

* * * * *